(12) United States Patent
Deng et al.

(10) Patent No.: US 11,721,090 B2
(45) Date of Patent: Aug. 8, 2023

(54) ADVERSARIAL METHOD AND SYSTEM FOR GENERATING USER PREFERRED CONTENTS

(71) Applicant: Samsung Electronics Co., Ltd., Suwon-Si (KR)

(72) Inventors: Yue Deng, Sunnyvale, CA (US); Yilin Shen, Sunnyvale, CA (US); Hongxia Jin, Mountain View, CA (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1161 days.

(21) Appl. No.: 16/041,479

(22) Filed: Jul. 20, 2018

(65) Prior Publication Data

US 2019/0026274 A1 Jan. 24, 2019

Related U.S. Application Data

(60) Provisional application No. 62/535,350, filed on Jul. 21, 2017.

(51) Int. Cl.
*G06V 10/82* (2022.01)
*G06N 3/08* (2023.01)
(Continued)

(52) U.S. Cl.
CPC ............ *G06V 10/82* (2022.01); *G06F 16/435* (2019.01); *G06F 18/2155* (2023.01);
(Continued)

(58) Field of Classification Search
None
See application file for complete search history.

(56) References Cited

U.S. PATENT DOCUMENTS 7,051,352 B1 * 5/2006 Schaffer ............... H04N 21/454
  725/39
7,231,652 B2 * 6/2007 Gutta ..................... G06N 20/00
  725/46
(Continued)

FOREIGN PATENT DOCUMENTS

KR        1678779 B1    11/2016
KR   2017-0060828 A      6/2017

OTHER PUBLICATIONS

Guo, H. et al., "DeepFM: a factorization-machine based neural network for CTR prediction." arXiv preprint arXiv:1703.04247. Mar. 13, 2017. pp. 1-8. Cornell University.
(Continued)

*Primary Examiner* — An Son P Huynh
(74) *Attorney, Agent, or Firm* — Sherman IP LLP; Kenneth L. Sherman; Hemavathy Perumal

(57) ABSTRACT

A recommendation method includes retrieving content consumption data including content consumed and content not consumed. Based on the content consumption data, identifying a first piece of content not consumed. A first feature of the first piece of content related to negative consumption of the first piece of content is determined. A first system is used to revise the first feature to a second feature. A second piece of content including the second feature is provided to an electronic device. The second piece of content is a revised instance of the first piece of content.

19 Claims, 8 Drawing Sheets

(51) Int. Cl.
*G06V 20/40* (2022.01)
*H04N 21/25* (2011.01)
*H04N 21/466* (2011.01)
*H04N 21/45* (2011.01)
*G06F 18/241* (2023.01)
*G06F 18/245* (2023.01)
*G06F 18/214* (2023.01)
*G06N 3/045* (2023.01)
*G06N 3/047* (2023.01)
*G06V 10/764* (2022.01)
*G06V 10/774* (2022.01)
*G06F 16/435* (2019.01)
*G06Q 30/0251* (2023.01)

(52) U.S. Cl.
CPC .......... *G06F 18/241* (2023.01); *G06F 18/245* (2023.01); *G06N 3/045* (2023.01); *G06N 3/047* (2023.01); *G06N 3/08* (2013.01); *G06Q 30/0269* (2013.01); *G06V 10/764* (2022.01); *G06V 10/7753* (2022.01); *G06V 20/46* (2022.01); *H04N 21/251* (2013.01); *H04N 21/45* (2013.01); *H04N 21/466* (2013.01); *H04N 21/4666* (2013.01); *H04N 21/4668* (2013.01)

(56) References Cited

U.S. PATENT DOCUMENTS

| | | | | |
|---|---|---|---|---|
| 7,555,523 | B1* | 6/2009 | Hartmann | H04L 51/12 709/206 |
| 8,327,395 | B2* | 12/2012 | Lee | H04H 60/64 725/12 |
| 8,495,683 | B2* | 7/2013 | van Coppenolle | H04N 21/812 725/9 |
| 9,588,760 | B1* | 3/2017 | Bostick | G06F 8/71 |
| 9,996,981 | B1* | 6/2018 | Tran | A43B 17/00 |
| 10,043,065 | B2* | 8/2018 | Pulido | G06V 40/28 |
| 10,257,572 | B2* | 4/2019 | Manus | G06N 7/005 |
| 10,481,749 | B1* | 11/2019 | Alfishawi | G06F 3/0481 |
| 10,645,455 | B1* | 5/2020 | Glaeser | H04N 21/2668 |
| 10,685,481 | B2* | 6/2020 | Tran | A61B 5/1128 |
| 10,909,505 | B2* | 2/2021 | Sreedhara | G06Q 10/1095 |
| 11,206,463 | B2* | 12/2021 | Harb | H04N 21/8549 |
| 11,321,386 | B2* | 5/2022 | McCarty | G06F 16/632 |
| 2002/0144262 | A1* | 10/2002 | Plotnick | H04N 21/252 725/32 |
| 2002/0169731 | A1* | 11/2002 | Gutta | G06N 20/00 706/25 |
| 2003/0066067 | A1* | 4/2003 | Gutta | H04N 21/4668 725/9 |
| 2003/0182249 | A1* | 9/2003 | Buczak | H04N 21/454 706/15 |
| 2006/0271429 | A1* | 11/2006 | Borgs | G06Q 30/0283 705/14.69 |
| 2008/0155588 | A1 | 6/2008 | Roberts et al. | |
| 2008/0249833 | A1 | 10/2008 | Ali et al. | |
| 2009/0119179 | A1 | 5/2009 | Kolve et al. | |
| 2009/0148045 | A1 | 6/2009 | Lee et al. | |
| 2010/0306048 | A1 | 12/2010 | Corduneanu et al. | |
| 2012/0278331 | A1* | 11/2012 | Campbell | H04N 21/44204 707/E17.09 |
| 2013/0073390 | A1 | 3/2013 | Konig et al. | |
| 2013/0145385 | A1* | 6/2013 | Aghajanyan | H04N 21/4667 725/10 |
| 2013/0205314 | A1* | 8/2013 | Ramaswamy | H04N 21/44218 725/14 |
| 2014/0079295 | A1* | 3/2014 | Yoon | G06V 40/45 382/115 |
| 2015/0242929 | A1* | 8/2015 | Wilkinson | A43D 3/024 705/26.7 |
| 2016/0048900 | A1* | 2/2016 | Shuman | G06Q 30/0204 705/7.33 |
| 2016/0063012 | A1* | 3/2016 | Sundaresan | G06F 16/338 707/706 |
| 2016/0088332 | A1 | 3/2016 | Lind et al. | |
| 2016/0094875 | A1* | 3/2016 | Peterson | H04N 21/47217 725/41 |
| 2016/0267529 | A1* | 9/2016 | Jakobsson | G06Q 30/0277 |
| 2016/0342683 | A1* | 11/2016 | Lim | G06F 16/3329 |
| 2017/0031920 | A1 | 2/2017 | Manning et al. | |
| 2017/0032396 | A1* | 2/2017 | Gupta | H04L 67/5651 |
| 2017/0046733 | A1 | 2/2017 | Schler | |
| 2017/0054779 | A1* | 2/2017 | Ehmann | G06F 3/165 |
| 2017/0061528 | A1* | 3/2017 | Arora | G06F 16/958 |
| 2017/0108995 | A1* | 4/2017 | Ali | G06F 3/0481 |
| 2017/0185690 | A1 | 6/2017 | Raichelgauz et al. | |
| 2017/0199874 | A1 | 7/2017 | Patel et al. | |
| 2017/0264920 | A1* | 9/2017 | Mickelsen | H04N 21/4532 |
| 2017/0337214 | A1* | 11/2017 | Ko | G06F 16/215 |
| 2018/0053142 | A1* | 2/2018 | Martin | G06N 20/00 |
| 2018/0101534 | A1* | 4/2018 | Alexander, Jr. | G06F 16/93 |
| 2018/0150882 | A1* | 5/2018 | Hu | G06Q 30/0269 |
| 2018/0180891 | A1* | 6/2018 | Kim | A61B 3/0025 |
| 2018/0189282 | A1* | 7/2018 | Hartlaub | G06F 16/437 |
| 2018/0249215 | A1* | 8/2018 | Wilkinson | H04L 67/535 |
| 2018/0253755 | A1* | 9/2018 | Cheng | G06F 15/76 |
| 2019/0028766 | A1* | 1/2019 | Wold | G06Q 50/184 |
| 2019/0087472 | A1* | 3/2019 | Dong | G06F 16/24578 |

OTHER PUBLICATIONS

Zhou, G. et al., "Deep interest network for click-through rate prediction." In Proceedings of the 24th ACM SIGKDD International Conference on Knowledge Discovery & Data Mining. Jul. 19, 2018, pp. 1059-1068. ACM Digital Library.
Extended European Search Report dated Jul. 13, 2020 for European Application No. 18834376.8 from European Patent Office, pp. 1-8. Munich, Germany.
International Search Report and Written Opinion dated Oct. 25, 2018 for International Application PCT/KR2018008310 from Korean Intellectual Property Office, pp. 1-19, Republic of Korea.
Chinese Office Action dated Feb. 23, 2023 for Chinese Patent Application No. 201880045026.4 from China National Intellectual Property Administration, pp. 1-16, Beijing, China.

* cited by examiner

500

---
: Training DAN
---

Input       : Ads Features $X$ and their labels $Y$
Initialization: Randomly Initialize all parameters $\Theta_T$ of disguise neural network $T$ and $\Theta_D$ of discriminator Neural Network $D$; Find all negative samples $X^-$ in $X$ 1. for *epoch=1...K* do
2.     for *all mini-batches in Training Data* do
3.         Minimize the the disguise loss in Eq. 1 with $X^-$ and update $\Theta_T$ in $T$
4.         Feed all negative samples $X^-$ through disguise neural network with current $\Theta_T$ and get the the disguised samples $Z$
5.         Feed the discriminator with both supervised data ($X$) and unlabeled disguised data $Z = T(X^-)$; treat $Z$ as unsupervised samples
6.         Minimize the discriminator loss in Eq. 3 and update $\Theta_D$ in $D$
7.     end
8. end

Output    : Discriminator Neural Network $D$ with parameter $\Theta_D$

FIG. 5

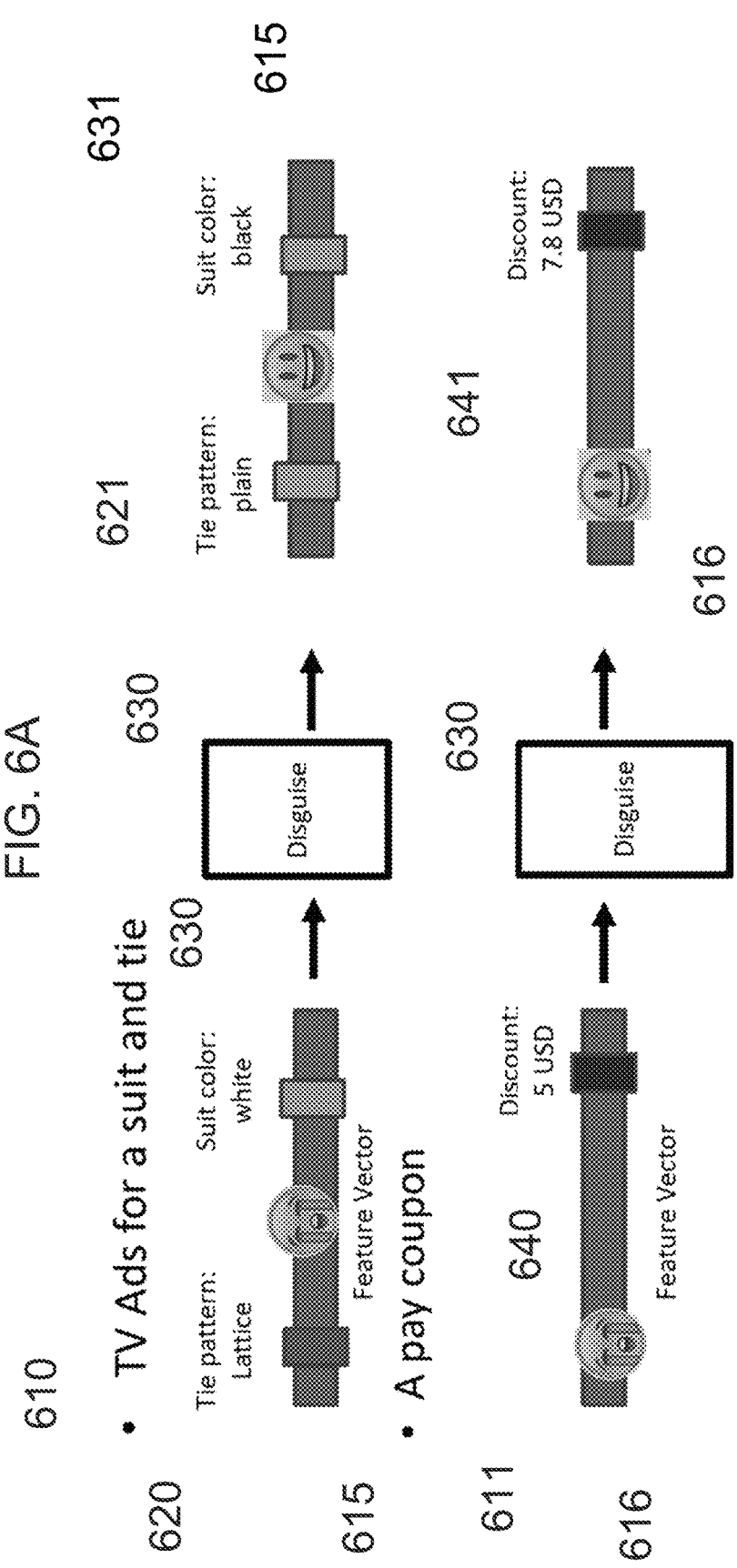

ADVERSARIAL METHOD AND SYSTEM FOR GENERATING USER PREFERRED CONTENTS

CROSS-REFERENCE TO RELATED APPLICATIONS

This application claims the priority benefit of U.S. Provisional Patent Application No. 62/535,350, filed on Jul. 21, 2017, which is incorporated herein by reference in its entirety.

COPYRIGHT DISCLAIMER

A portion of the disclosure of this patent document may contain material that is subject to copyright protection. The copyright owner has no objection to the facsimile reproduction by anyone of the patent document or the patent disclosure as it appears in the patent and trademark office patent file or records, but otherwise reserves all copyright rights whatsoever.

TECHNICAL FIELD

One or more embodiments generally relate to data processing using neural networks (NN) and, in particular, to data processing using adversarial learning.

BACKGROUND

Deep neural networks (DNNs) have become ubiquitous in machine learning with applications, ranging from computer vision, to speech recognition, and natural language processing. DNNs define parameterized functions from inputs to outputs, as compositions of many layers of basic functions, both linear/affine transformations and nonlinear functions DNNs are also becoming a powerful tool to tackle recommender systems tasks such as music, news, fashion articles, and mobile apps recommendation. Many media contents, advertisements, coupon contents, promotions, etc. are served to the user by existing recommendation systems. There is a good probability that a large number of recommended contents are disliked by end users. Conventional recommender systems discard these disliked contents. As a result, these recommendation systems fail to provide users any user preferred recommendations.

SUMMARY

One or more embodiments generally relate to content management based on adversarial machine learning. In one embodiment, a recommendation method includes retrieving content consumption data comprising content consumed and content not consumed. Based on the content consumption data, identifying a first piece of content not consumed. A first feature of the first piece of content related to negative consumption of the first piece of content is determined. A first system is used to revise the first feature to a second feature. A second piece of content including the second feature is provided to an electronic device. The second piece of content is a revised instance of the first piece of content.

In some embodiments, an electronic device includes a memory storing instructions. At least one processor executes the instructions including a process configured to retrieve content consumption data comprising content consumed and content not consumed, identify, based on the content consumption data, a first piece of content not consumed; determine a first feature of the first piece of content related to negative consumption of the first piece of content; revise, using a first system, the first feature to a second feature, and provide a second piece of content including the second feature, wherein the second piece of content is a revised instance of the first piece of content.

In one or more embodiments, a non-transitory processor-readable medium that includes a program that when executed by a processor performing a method that includes retrieving content consumption data comprising content consumed and content not consumed; identifying, based on the content consumption data, a first piece of content not consumed; determining a first feature of the first piece of content related to negative consumption of the first piece of content; revising, using a first system, the first feature to a second feature; and providing, to an electronic device, a second piece of content including the second feature, wherein the second piece of content is a revised instance of the first piece of content.

These and other aspects and advantages of one or more embodiments will become apparent from the following detailed description, which, when taken in conjunction with the drawings, illustrate by way of example the principles of the one or more embodiments.

BRIEF DESCRIPTION OF THE DRAWINGS

For a fuller understanding of the nature and advantages of the embodiments, as well as a preferred mode of use, reference should be made to the following detailed description read in conjunction with the accompanying drawings, in which:

FIG. 5 shows an example process for training DAN, according to some embodiments;

FIG. 6A shows an example of disguising a feature vector for an advertisement (e.g., a Television (TV) advertisement), according to some embodiments;

FIG. 6B shows an example of disguising a feature vector for an electronic coupon, according to some embodiments;

DETAILED DESCRIPTION

Figure 1:
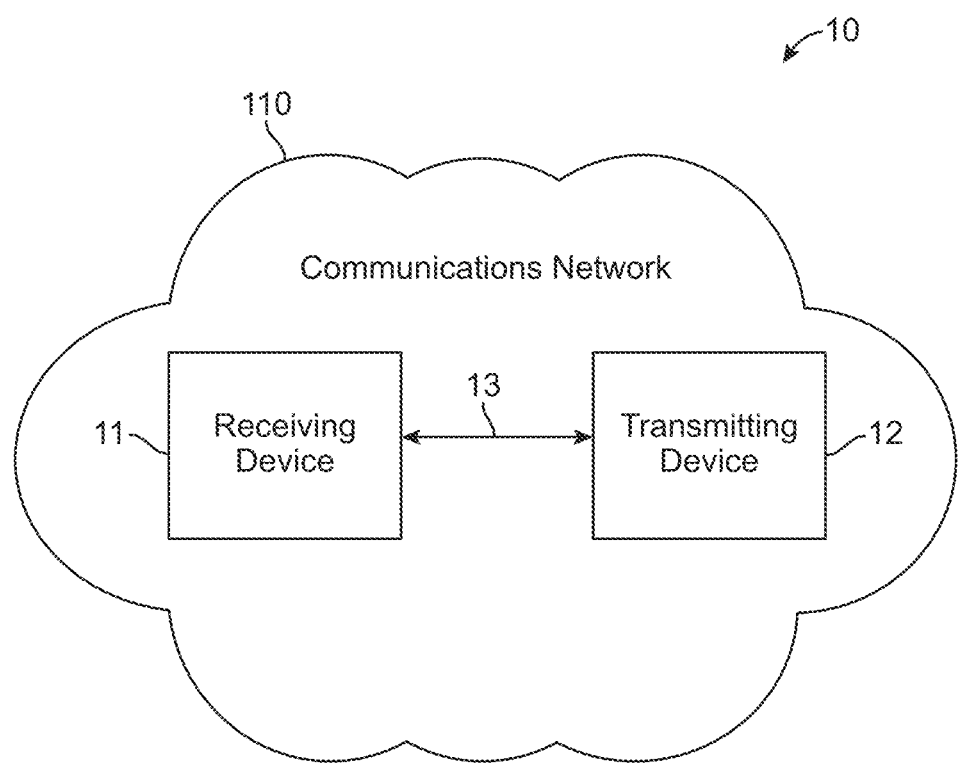
FIG. 1 shows a schematic view of a communications system, according to some embodiments.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

It should be noted that the terms "at least one of" refers to one or more than one of the elements that follow. For example,"at least one of a, b, c, or a combination thereof" may be interpreted as "a," "b," or "c" individually; or as "a" and "b" together in combination, as "b" and "c" together in combination; as "a" and "c" together in combination; or as "a," "b" and "c" together in combination.

One or more embodiments provide for content management based on adversarial machine learning. Some embodiments include a method that includes a recommendation method includes retrieving content consumption data comprising content consumed and content not consumed. Based on the content consumption data, identifying a first piece of content not consumed. A first feature of the first piece of content related to negative consumption of the first piece of content is determined. A first system is used to revise the first feature to a second feature. A second piece of content including the second feature is provided to an electronic device. The second piece of content is a revised instance of the first piece of content.

DNN are powerful and popular learning models that achieve state-of-the-art pattern recognition performance on many computer vision, speech, and language processing tasks. For clarity, the term "network" refers to network architecture (e.g., NN architecture) that describes the transformation applied on the input, whereas "model" refers to a trained network with fixed parameters obtained by training a network on some training dataset.

In some embodiments, user disliked contents are revised to be liked contents. The "content" mentioned herein includes, but is not limited to, advertisement content, media content, TV streams/streaming, coupons, promotions, virtual reality (VR) content, promotions, etc. In some embodiments, a machine learning framework is employed and is referred to as 'adversarial critic learning.' Adversarial learning releases the demand of human provided labels to train a machine learning model. Adversarial critic learning designs an adversarial gambling between the generator to provide more augmented evaluations for newly generated features. The idea of adversarial learning is used to handle imperfect label problems in machine learning. The imperfect label covers imbalanced label distributions and wrong labels involved in a labeled dataset. A recommender system is used to revise disliked contents, evaluate the likelihood of "liking" the revised content, and then recommends the successfully revised content.

In some embodiments, the adversarial critic learning mechanism is used to evaluate generated new content by artificially offering labels for the generated data. This function allows the learning framework to more robustly treat imperfect labels in the training data. Such imperfect label distribution includes imbalanced labels, noisy labels and even missing labels. Some embodiments revise disliked content to liked content by revisiting the disliked contents and learning to improve them. Some embodiments do not pick up a brand new content, but revises the disliked content. This approach leads to increased recommender opportunities and can be extended to a personalized setting.

In some embodiments, adversarial optimization is employed in a recommender system. Conventional recommender systems form their recommender decision purely based on the real data obtained from users. Such data may be partial and cannot sufficiently cover the whole set of possible actions and feedbacks. Distinguishable, some embodiments employ an adversarial recommendation to evaluate the recommended content from both real-world data and generated features. The generated content and user's feedback is not obtained from real-world data but are simulated by the adversarial critic learning processing.

Some embodiments provide the ability to: generate new revised contents that are previously disliked by end-users; identify the likelihood probability of the generated new content and other real world content; use virtual adversarial learning to design a practical recommender system that needs less training data than conventional systems; use adversarial critic learning to classify data points with imbalanced label distribution; use adversarial critic learning to classify data with wrong labels, and reduce the demands of training samples size in recommender systems.

FIG. 1 is a schematic view of a communications system 10, in accordance with one embodiment. Communications system 10 may include a communications device that initiates an outgoing communications operation (transmitting device 12) and a communications network 110, which transmitting device 12 may use to initiate and conduct communications operations with other communications devices within communications network 110. For example, communications system 10 may include a communication device that receives the communications operation from the transmitting device 12 (receiving device 11). Although communications system 10 may include multiple transmitting devices 12 and receiving devices 11, only one of each is shown in FIG. 1 to simplify the drawing. Communications system 10 may form partially the adversial learning framework, in one embodiment.

Any suitable circuitry, device, system or combination of these (e.g., a wireless communications infrastructure including communications towers and telecommunications servers) operative to create a communications network may be used to create communications network 110. Communications network 110 may be capable of providing communications using any suitable communications protocol. In some embodiments, communications network 110 may support, for example, traditional telephone lines, cable television, Wi-Fi (e.g., an IEEE 802.11 protocol), BLUETOOTH®, high frequency systems (e.g., 900 MHz, 2.4 GHz, and 5.6 GHz communication systems), infrared, other relatively localized wireless communication protocol, or any combination thereof. In some embodiments, the communications network 110 may support protocols used by wireless and cellular phones and personal email devices (e.g., a BLACKBERRY®). Such protocols may include, for example, GSM, GSM plus EDGE, CDMA, quadband, and other cellular protocols. In another example, a long-range communications protocol can include Wi-Fi and protocols for placing or receiving calls using VOIP, LAN, WAN, or other TCP-IP based communication protocols. The transmitting device 12 and receiving device 11, when located within communications network 110, may communicate over a bidirectional communication path such as path 13, or over two unidirectional communication paths. Both the transmitting device 12 and receiving device 11 may be capable of initiating a communications operation and receiving an initiated communications operation.

The transmitting device 12 and receiving device 11 may include any suitable device for sending and receiving communications operations. For example, the transmitting device 12 and receiving device 11 may include, but are not limited to mobile telephone devices, television (TV) systems, smart TV systems, cameras, camcorders, a device with audio video capabilities, tablets, wearable devices, smart appliances, smart picture frames, and any other device capable of communicating wirelessly (with or without the aid of a wireless-enabling accessory system) or via wired pathways (e.g., using traditional telephone wires). The communications operations may include any suitable form of communications, including for example, voice communications (e.g., telephone calls), data communications (e.g., data and control messaging, e-mails, text messages, media messages), video communication, or combinations of these (e.g., video conferences).

Figure 2:
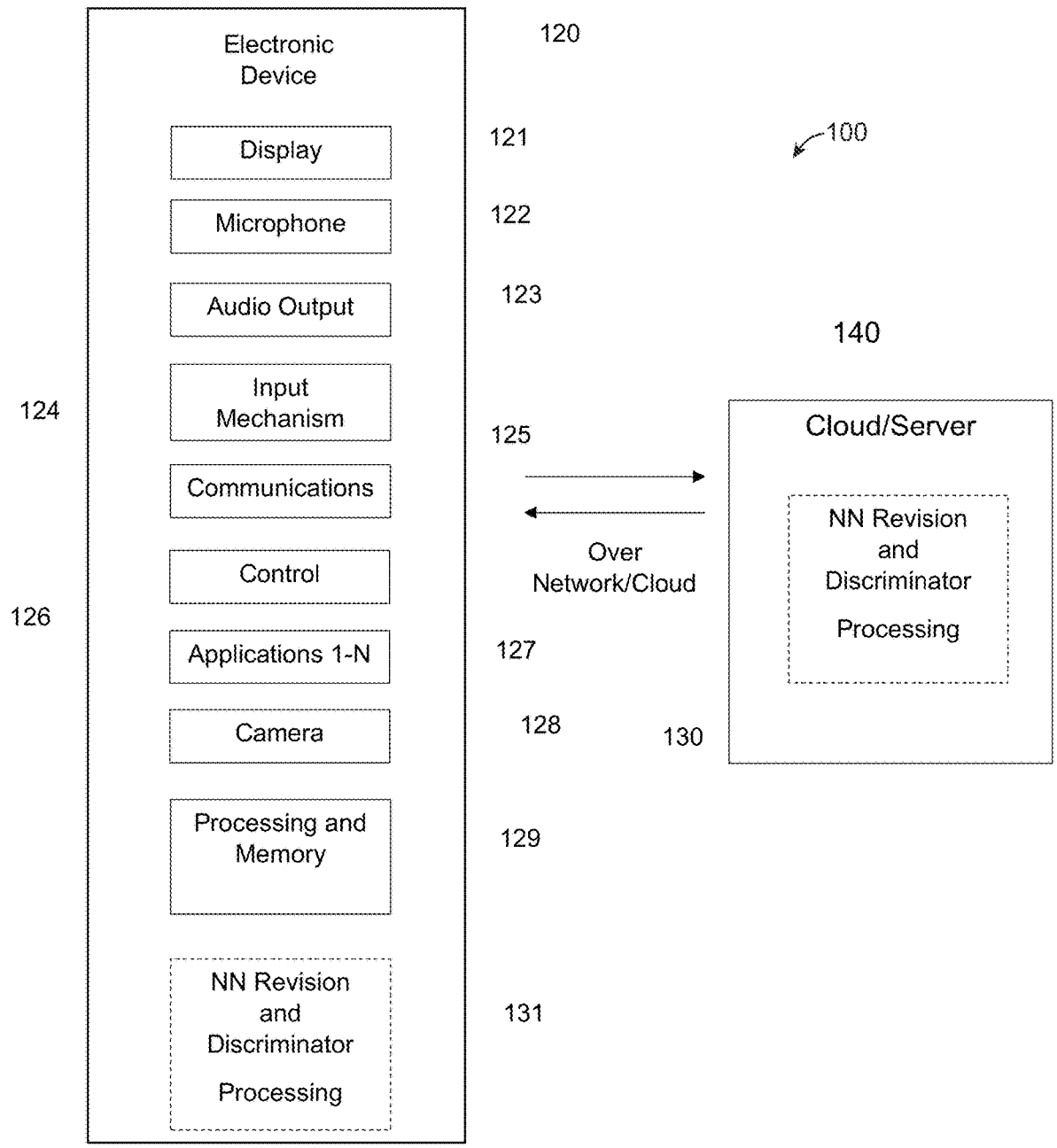
FIG. 2 shows a block diagram of architecture for a system including an electronic device and a cloud or server environment, that is capable of performing individually or in combination, adversarial learning based data processing, according to some embodiments.

FIG. 2 shows a block diagram of an architecture for a system 100 that is capable of performing data processing using adversarial learning using an electronic device 120 (e.g., mobile telephone devices, TV systems, cameras, camcorders, a device with audio video capabilities, tablets, pad devices, wearable devices, smart appliances, smart picture frames, smart lighting, etc.), a cloud or server 140, or a combination of the electronic device 120 and the cloud computing (e.g., shared pools of configurable computing system resources and higher-level services, etc.) or server (e.g., a computer, device, or program that manages network resources, etc.) 140. Both the transmitting device 12 (FIG. 1) and receiving device 11 may include some or all of the features of the electronics device 120. In some embodiments, the electronic device 120 may comprise a display 121, a microphone 122, an audio output 123, an input mechanism 124, communications circuitry 125, control circuitry 126, a camera 128, processing and memory 129, NN revision and discriminator processing 130 and/or 131 (for revising content based on adversarial machine learning using NN revision and NN discriminator processing on the electronic device 120, on the cloud/server 140, on a combination of the electronic device 120 and the cloud/server 140, communicating with the communications circuitry 125 to obtain/provide information thereof with the cloud or server 140; and may include any of the processing for, but not limited to, the examples as described below), and any other suitable components. Applications 1-N 127 are provided and may be obtained from a cloud or server 140, a communications network 110, (FIG. 1) etc., where N is a positive integer equal to or greater than 1.

In some embodiments, all of the applications employed by the audio output 123, the display 121, input mechanism 124, communications circuitry 125, and the microphone 122 may be interconnected and managed by control circuitry 126. In one example, a handheld music player capable of transmitting music to other tuning devices may be incorporated into the electronics device 120.

In some embodiments, the audio output 123 may include any suitable audio component for providing audio to the user of electronics device 120. For example, audio output 123 may include one or more speakers (e.g., mono or stereo speakers) built into the electronics device 120. In some embodiments, the audio output 123 may include an audio component that is remotely coupled to the electronics device 120. For example, the audio output 123 may include a headset, headphones, or earbuds that may be coupled to communications device with a wire (e.g., coupled to electronics device 120 with a jack) or wirelessly (e.g., BLUETOOTH® headphones or a BLUETOOTH® headset).

In some embodiments, the display 121 may include any suitable screen or projection system for providing a display visible to the user. For example, display 121 may include a screen (e.g., an LCD screen, LED screen, OLED screen, etc.) that is incorporated in the electronics device 120. As another example, display 121 may include a movable display or a projecting system for providing a display of content on a surface remote from electronics device 120 (e.g., a video projector). Display 121 may be operative to display content (e.g., information regarding communications operations or information regarding available media selections) under the direction of control circuitry 126.

In some embodiments, input mechanism 124 may be any suitable mechanism or user interface for providing user inputs or instructions to electronics device 120. Input mechanism 124 may take a variety of forms, such as a button, keypad, dial, a click wheel, mouse, visual pointer, remote control, one or more sensors (e.g., a camera or visual sensor, a light sensor, a proximity sensor, etc., or a touch screen. The input mechanism 124 may include a multi-touch screen.

In some embodiments, communications circuitry 125 may be any suitable communications circuitry operative to connect to a communications network (e.g., communications network 110, FIG. 1) and to transmit communications operations and media from the electronics device 120 to other devices within the communications network. Communications circuitry 125 may be operative to interface with the communications network using any suitable communications protocol such as, for example, Wi-Fi (e.g., an IEEE 802.11 protocol), Bluetooth®, high frequency systems (e.g., 900 MHz, 2.4 GHz, and 5.6 GHz communication systems), infrared, GSM, GSM plus EDGE, CDMA, quadband, and other cellular protocols, VOIP, TCP-IP, or any other suitable protocol.

In some embodiments, communications circuitry 125 may be operative to create a communications network using any suitable communications protocol. For example, communications circuitry 125 may create a short-range communications network using a short-range communications protocol to connect to other communications devices. For example, communications circuitry 125 may be operative to create a local communications network using the BLUETOOTH® protocol to couple the electronics device 120 with a BLUETOOTH® headset.

In some embodiments, control circuitry 126 may be operative to control the operations and performance of the electronics device 120. Control circuitry 126 may include, for example, a processor, a bus (e.g., for sending instructions to the other components of the electronics device 120), memory, storage, or any other suitable component for controlling the operations of the electronics device 120. In some embodiments, one or more processors (e.g., in processing and memory 129) may drive the display and process inputs received from the user interface. The memory and storage may include, for example, cache, Flash memory, ROM, and/or RAM/DRAM. In some embodiments, memory may be specifically dedicated to storing firmware (e.g., for device applications such as an operating system, user interface functions, and processor functions). In some embodiments, memory may be operative to store information related to other devices with which the electronics device 120 performs communications operations (e.g., saving contact information related to communications operations or storing information related to different media types and media items selected by the user).

In some embodiments, the control circuitry 126 may be operative to perform the operations of one or more applications implemented on the electronics device 120. Any suitable number or type of applications may be implemented. Although the following discussion will enumerate different applications, it will be understood that some or all of the applications may be combined into one or more applications. For example, the electronics device 120 may include applications 1-N 127 including, but not limited to: an automatic speech recognition (ASR) application, OCR application, a dialog application, a map application, a media application (e.g., QuickTime, MobileMusic.app, or MobileVideo.app), social networking applications (e.g., FACEBOOK®, INSTAGRAIVI®, TWITTER®, etc.), a calendaring application (e.g., a calendar for managing events, appointments, etc.), an Internet browsing application, a recommender application, etc. In some embodiments, the electronics device 120 may include one or multiple applications operative to perform communications operations. For example, the electronics device 120 may include a messaging application, an e-mail application, a voicemail application, an instant messaging application (e.g., for chatting), a videoconferencing application, a fax application, or any other suitable application for performing any suitable communications operation.

In some embodiments, the electronics device 120 may include a microphone 122. For example, electronics device 120 may include microphone 122 to allow the user to transmit audio (e.g., voice audio) for speech control and navigation of applications 1-N 127, during a communications operation or as a means of establishing a communications operation or as an alternative to using a physical user interface. The microphone 122 may be incorporated in the electronics device 120, or may be remotely coupled to the electronics device 120. For example, the microphone 122 may be incorporated in wired headphones, the microphone 122 may be incorporated in a wireless headset, the microphone 122 may be incorporated in a remote control device, etc.

In some embodiments, the camera module 128 comprises one or more camera devices that include functionality for capturing still and video images, editing functionality, communication interoperability for sending, sharing, etc. photos/videos, etc.

In some embodiments, the electronics device 120 may include any other component suitable for performing a communications operation. For example, the electronics device 120 may include a power supply, ports, or interfaces for coupling to a host device, a secondary input mechanism (e.g., an ON/OFF switch), or any other suitable component.

Figure 3B:
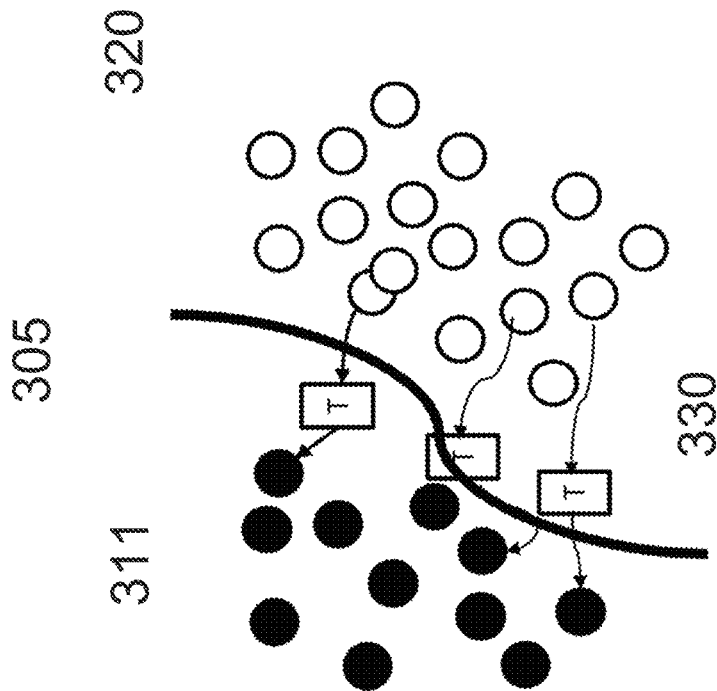
FIG. 3B shows an example solution for the imbalanced data classification of FIG. 3A by transforming major class samples to generate more minor class samples, according to some embodiments.
Figure 3A:
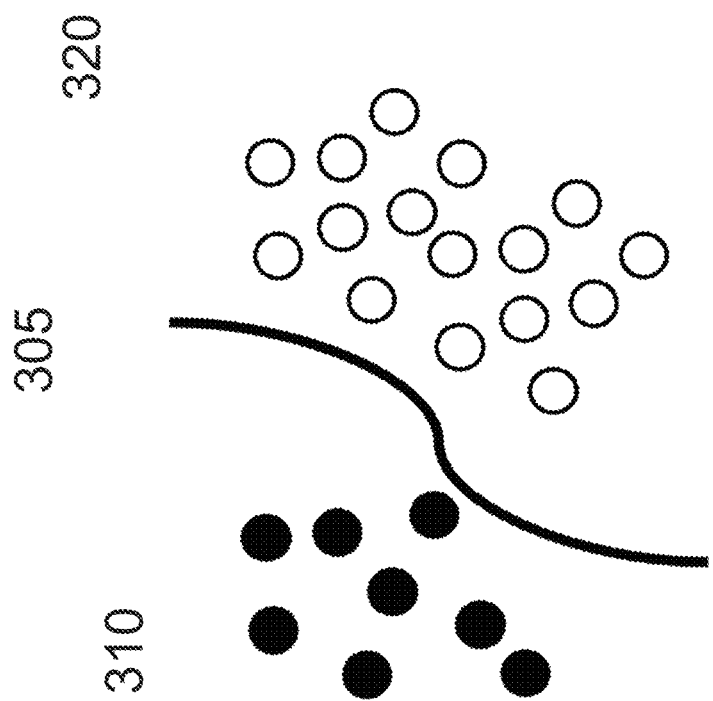
FIG. 3A shows an example of an imbalanced data classification.

FIG. 3A shows an example of an imbalanced data classification. The information samples 310 are referred to as the minor class (e.g., liked content, clicked advertisement information log data, user consumed a recommendation, etc.). The line 305 represents the classification. The information samples 320 are referred to as the major class (e.g., disliked content, non-clicked information logs for advertisements, user did not consume a recommendation, etc.). As shown, the information samples are not balanced with information samples 310 on the minor class side being insufficient relative to the information samples 320 on the major class side. One approach is to perform major class down-sampling. While this may balance the two classes, information about the minor class is not well enriched (e.g., increased with samples from the minor class such that both classes are balanced). Another approach is to perform minor class up-sampling by over sampling the points in the minor class adding synthetic "fake" samples in the minor class. The quality, however, of generated data by up-sampling is low as compared with actual data.

FIG. 3B shows an example solution for the imbalanced data classification of FIG. 3A by transforming (using transformation T 330) major class information samples 320 to generate more minor class information samples 311, according to some embodiments. In some embodiments, some of the information samples 320 in the major class are transformed (using transformation T 330) as new samples in the minor class information samples 310 of FIG. 3A to become information samples 311. In some embodiments, a transformation T 330 converts some major class information samples 320 as minor class information samples 311. The balances between the two classes are generally enhanced as a result of the transforming, as illustrated in FIG. 3B. In some embodiments, the transformation T 330 includes use of Disguise-Adversarial-Networks (DAN) as described below.

In some embodiments, NNs based Disguise-Adversarial-Networks (DAN) are employed to improve the accuracy of supervised learning with limited positive-class information. In the context of click-through rate (CTR) prediction, the rationality behind DAN may be intuitively understood as "non-clicked Ads makeup." DAN disguises the disliked contents (e.g., ignored advertisements, ad impressions (non-clicks), etc.) to be interesting contents and encourages a discriminator to classify these disguised contents as positive recommendations. In an adversarial aspect, the discriminator is sober-minded, which is optimized to allocate these disguised contents to their inherent classes according to an unsupervised information theoretic assignment strategy. Results from using DAN significantly outperform conventional supervised learning and generative adversarial networks (GAN) in CTR prediction.

In some embodiments, DAN may be implemented for minor class augmentation to achieve the effect of up-sampling. DAN solves the CTR prediction problem associated with imbalanced labels. DAN incorporates a disguise neural network to generate more samples to enrich the minor class by disguising negative samples (i.e., major class samples). In some embodiments, the disguise neural network "cheats" a discriminator (a discriminator neural network) to believe all of the disguised samples are all positive. A discriminator neural network is also implemented to clearly assign these disguised samples into their inherent classes via an information theoretic discriminative clustering strategy. DAN improves both recommendation frequency and accuracy over conventional systems. DAN is also very effective when less training data are available. DAN maintains reasonable good performances even though reducing the size of training samples to, for example, 10%, which provides for increased processing speed.

One significant problem in Ads data (or advertisement data) is the imbalanced label distribution, i.e. limited positive samples (clicks) versus abundant negative samples (non-clicks). A natural solution to this problem is to enrich the information of the minor positive group. However, it may be impossible to directly seek more positive samples from users in real-world scenarios. In some embodiments, DAN generates more positive samples via a generative DNN. In some embodiments, DAN uses what is referred to as "Ads Makeup." The general assumption for Ads Makeup is that if some properties of the disliked Ads are slightly changed/modified, it may have a chance to become an interesting one (which would result in a positive sample). The Ads feature vector contains one entry denoting the presenting time of the Ads. For example, if Ads impression for "super bowl game" is pushed to a user at 10:00 AM (with the Ads' time feature denoted as 'morning'), the Ads may not be clicked because morning time may always be a business hour. Accordingly, a non-click record about "super bowl Ads" is accumulated in the training data. But it does not necessarily mean the "super bowl Ads" itself is bad and is not liked by the user. In some embodiments all other features in the Ads remain the same but the Ad's show time feature is changed from 'morning' to 'night.' Then the modified disliked original Ads may become popular and gain a click based on the show time modification. Following the rationality discussed above, a large amount of non-clicks in the historic data can be converted to interesting ones with slight modifications. In some embodiments, DAN transforms and makes up for non-clicks.

In some embodiments, a "Discriminator Neural Network," a discriminator, is employed to mimic real user's behavior on Ads clicking. From the aspect of DAN, its objective is to ultimately disguise the non-clicked Ads and encourage the discriminator to classify these disguised Ads as positive. In an adversarial view, the discriminator avoids being cheated by the disguise network and uses a "smart" objective to identify the disguised Ads.

Figure 4:
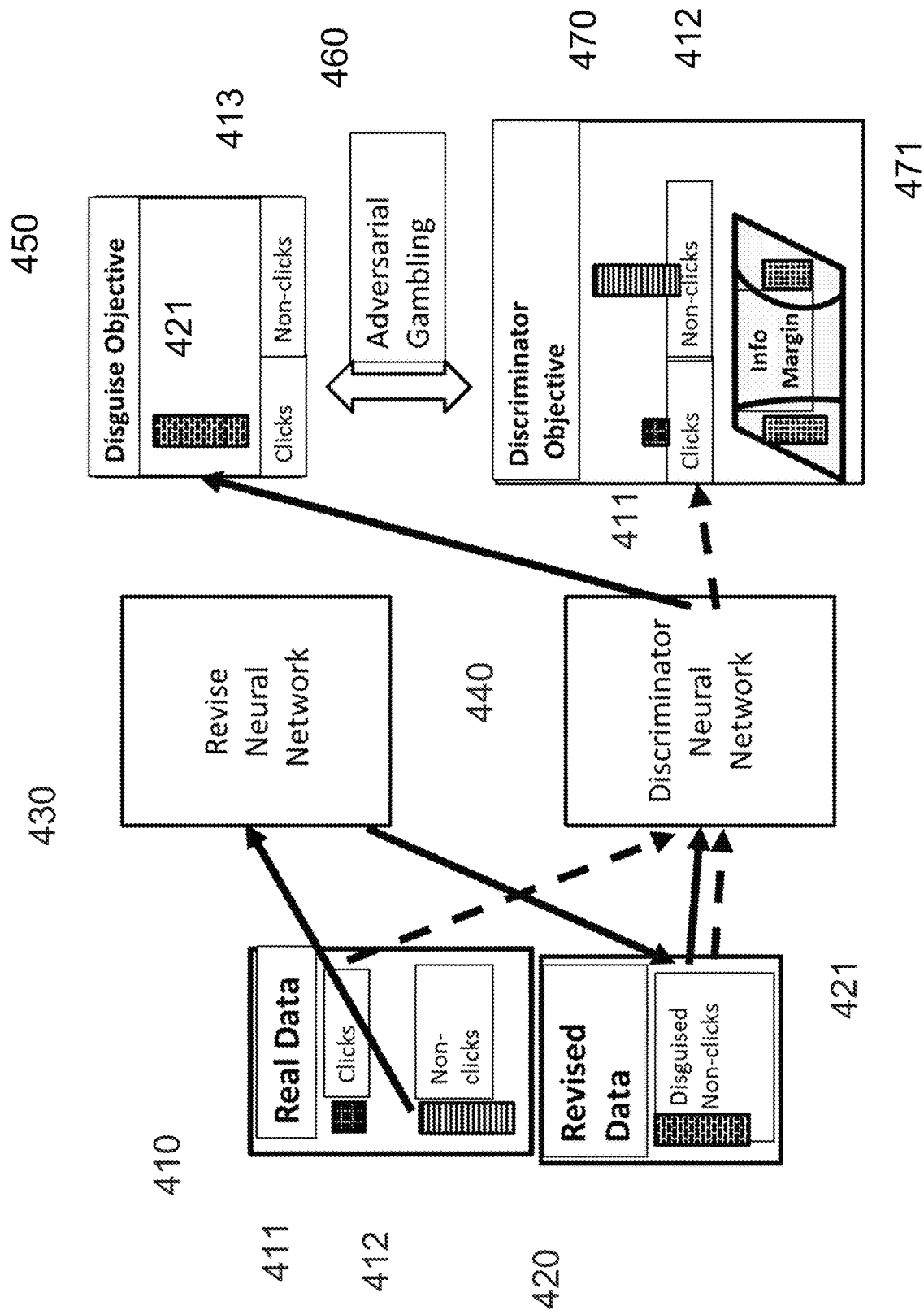
FIG. 4 shows an overview of a Disguise Adversarial Network (DAN). according to some embodiments.

FIG. 4 shows an overview of DAN, according to some embodiments. The solid arrows indicate the training processes flow of the revise (or disguise) NN 430 of DAN, while the dashed arrows indicate the flow for the discriminator NN 440 of DAN. In some embodiments, the discriminator NN 440 objectives includes two options. The first option is the "tough objective" which is set up to assign all disguised contents (e.g., disguised Ads) to the negative class (e.g., non-clicks). The first option for an objective may be too strict to be reasonable. There should be a number of successfully disguised contents (e.g., disguised Ads), for example super bowl Ads with time feature denoted as "morning," that could be assigned to the positive class after makeup. In one example, if treating all disguised Ads as non-clicks, these successfully disguised Ads and their corresponding favorite feature content may not be correctly fed to the positive side of the classifier. Therefore, a more reasonable "mild objective" may be used for the discriminator NN 440. The mild objective should assign the disguised data into two classes (e.g., clicks and non-clicks) according to their feature value. To achieve this, a clustering objective is designed for the discriminator NN 440 to encourage a large margin between two classes. In some embodiments, the "mild objective" could smartly treat both successfully and unsuccessfully disguised samples without any biased pre-judgment. It should be noted that while the context of Ads may refer to CTR prediction, DAN is also adapted to general classification problems.

In some embodiments, DAN treats disliked content as input. These inputs can be summarized as a feature vector x. DAN passes disliked contents (e.g., non-clicked data 412 of real data 410) through the revise NN 430 to change some features of the disliked contents. DAN defines the revise NN 430 as a transformation T. In some embodiments, it should be noted that the transformation T may be implemented as processing, such as NN. DAN evaluates the revised content by evaluation processing, such as discriminator NN 430. The evaluation processing attempts to place revised contents into two classes, i.e. positive and negative classes. All samples assigned to the positive class are all successfully revised contents (e.g., disguised non-clicks 421 of revised data 420). The revised contents could be used to provide to the electronic device 120 (FIG. 2) for the user again. It means the corresponding disliked contents (e.g., non-clicks data 412) are now transformed as interesting ones by the revise NN 430. On the contrary, the negative class contains all unsuccessfully revised contents (e.g., remaining non-clicks data 412). The data in the negative class are all disliked contents even though after the transformations in the revise NN 430. The objective of the revise NN 430 is to persuade the evaluator processing to assign all revised contents 421 into the positive class (e.g., clicks) without any negative class (e.g., no non-click data 413). The objective of the evaluation processing is to fairly assign revised contents into both positive and negative classes according to their inherent feature properties/values. The objectives in the revise NN 430 and evaluation processing are jointly optimized via the adversarial optimization (e.g., adversarial gambling 460).

In some embodiments, although DAN may be described in the context of CTR prediction, all subsequent discussions about DAN are also seamlessly adapted to general classification problems. Following the rationality discussed above, there should be a large amount of disliked contents in the historic data that could be converted to interesting ones with modifications using DAN. DAN transforms one or more features of these contents. The discriminator NN 440 is designed to mimic a real user's behavior on contents rating. From the aspect of the revise NN 430, its objective is to ultimately transform the contents and encourage the discriminator NN 440 to classify these revised contents as positive. In an adversarial view, the discriminator NN 440 should avoid being cheated by the disguise network and come up with a "smart" objective to identify these revised contents. In some embodiments, the discriminator NN 440 is a trained model that has gone through a training phase. In the training phase for NNs, the correct class for each record is known, and the output node is assigned "correct" values— (e.g., 1, 0.9, etc.) for the node corresponding to the correct class, and assigned incorrect values for others (e.g., 0, 0.1, etc.). A comparison of the NN calculated values for the output nodes to these "correct" values is made, and a calculation is made of an error term for each node. The error terms are used to adjust weights so further iterations result with output values that are closer to the "correct" values. Thus, for each iteration, weights associated with input values are adjusted each time. During this training phase, the NN learns by adjusting the weights to predict the correct class label of input samples.

In some embodiments, the revise NN 430 learning portion is linked by the solid arrows. There are M positive samples (clicks 411) $x^+ \sim P_A+(x)$ and N negative samples (non-clicks 412) $x^- \sim P_A-(x)$.), M<N for imbalanced cases. $A^+$ (resp. $A^-$) represents the positive samples' (resp. negative samples') space. The revise NN 430 T( ) maps the negative samples to $z=T(x^-) \sim P_{\hat{A}}(z)$ where $\hat{A}$ is space spanned by those disguised samples z (revised clicks 421), where z shares the same dimension as the real-world data $x^+$ and $x^-$. The learning purpose of the revise NN 430 is to encourage the equivalence of two distributions $P_A+(x)$ and $P_A+(z)$. From the "disguise objective" 450, it is apparent that the disguise objective intends to assign all disguised data (disguised non-clicks 421) to the positive class with the discriminator NN 440 D(·). The last layer in NN 440 D(·) is connected with a sigmoid output to indicate the probability that the input sample is positive. Therefore, we could mathematically write the disguise learning objective:

$$L_1(T,D) = -E_x-[\log D(T(x^-)] + \lambda \|T(x^-) - x^-\|_1.$$  Eq. (1)

The first term is the Kullback-Liebler (KL) divergence between the output probability and the positive distribution. KL is a part of the cross-entropy term. The second term uses a $l_1$ distance to restrict the disguise process to only 'slightly' change the original content. The $l_1$ distance is a part of the cross-entropy term.

Conventional generative adversarial networks are designed to generate a brand-new sample that never exists in real world. Conventional generative adversarial networks thus require sampling a random seed (vector) to feed in the generator and to produce a fabricated output. Distinguishable, in DAN, all samples are from real world data (e.g., real data 410) and the inputs to the revise NN 430 are practical negative samples. The revise NN 430 adjusts negative data to make the negative data comply with the distribution in the positive class. Therefore, the word "disguise" is used rather than "generator" in DAN. Such characteristic is apparent in FIG. 4 such that no random vector sampling function is included in DAN's infrastructure.

As indicated by dashed arrows in FIG. 4, the discriminator NN 440 takes both real data 410 and revised data 420 as inputs, according to some embodiments. Therefore, both of these two types of data contribute to the final loss in the discriminator NN 440. The real data 410 includes the user's clicking labels, so there is no difficulty to define a supervised loss for this part of data via the cross-entropy loss. The second part of the loss is the attitude of the discriminator NN 440 about disguised data. As described above, there are two possible ways for the discriminator NN 440 to handle disguised data via either "tough loss" or "mild loss." In some embodiments, the more reasonable "mild loss" is adopted and allows some negative data to be transformed as positive data. However, the difficulty is that there is no idea about which part of the disguised data behaves like positive samples and which part are still negative. To address such a problem, the information theoretic margin is maximized between positively and negatively disguised samples. Unlike other margins in supervised learning, such information theoretic margin is absolutely unsupervised. In DAN, it is assumed that there are N unlabeled points. When assigning these N points to 2 classes (l=1 or l=0) by the discriminator NN 440 D(·), the assignment confidence of the discriminator could be well characterized by the following additive conditional entropy $M_D(x)$, $$M_D(x) = -\frac{1}{N}\sum_i D(x_i)\log(D(x_i)) + [1 - D(x_i)]\log(1 - D(x_i)). \quad \text{Eq. (2)}$$

The conditional entropy captures the discriminative clustering margin between two classes and hence $M_D(x)$ is referred to as the information theoretic margin (e.g., info. margin 471). This term should be minimized to encourage a large margin between the clustering results. The aforementioned two parts of losses are combined together and form the final training objective for the discriminator NN 440:

$$L_2(T,D) = -E_x-[\log [1-D(x^-)]]-E_x+[\log [D(x^-)]+\eta M_D(T(x^-)), \quad \text{Eq. (3)}$$

where the first two terms come from the cross-entropy of the real world labeled data and the last term penalizes the margin of revised data 420 (e.g., disguised non-clicks 421). It should be noted that the approach in DAN is quite different from conventional generative adversarial networks in which the discriminator is only set up to classify whether a sample is real or fake. In conventional semi-supervised learning, the unlabeled data used for training are pre-fixed. Distinguishable, in some embodiments unsupervised samples in DAN are produced by the revise NN 430. Therefore, the discriminator NN 440 may get a chance to access different versions of disguised samples in multiple iterations. More importantly, the revise NN 440 also evolves and could produce more difficult samples for the discriminator along with training iterations going on. Therefore, compared with conventional semi-supervised learning, DAN is optimizable with more diverse and difficult unsupervised samples in the training phase. As such, DAN achieves better performance than conventional semi-supervised methods that only adopt pre-fixed unlabeled samples as assistance.

FIG. 5 shows an example process 500 for training DAN, according to some embodiments. The training of DAN is involved in a bilevel optimization that requires minimizing the disguise and the discriminator losses in turn. All training samples are divided into multiple mini-batches and these mini-batches are iteratively fed to train DAN. In one embodiment, a default value for K is chosen (e.g., K=100, etc.).

Deep learning frameworks have the reputation of "heavy to train." DAN requires a heavy training complexity due to the involvement of two (deep) NNs (the revise NN 430 and discriminator NN 440, FIG. 4). Additionally, the learning objectives of these two NNs are designed to go against each other. The gambling essence of adversarial training inevitably adds complexity to the optimization. In some embodiments, the training speed is improved by reducing total training samples. In some embodiments, improvement of training speed may be partially due to the self-data augmentation mechanism (balance the imbalanced data distribution) encoded in the adversarial learning framework of DAN. Therefore, it is reasonable to reduce the total training size while maintaining a good performance.

In some embodiments, it is possible to extend this framework to handling multi-class tasks. One extension is to implement DAN in a one versus others manner.

FIG. 6A shows an example of disguising a feature vector 615 for an advertisement (e.g., a Television (TV) advertisement 610), according to some embodiments. In the example TV advertisement 610, the feature vector 615 includes features including a tie pattern, a color of a suit, etc. For the original TV advertisement 610, the feature vector 615 includes a lattice tie pattern 620 for the tie pattern, and a white suit color 630. Assuming the received TV advertisement 610 was not clicked on, viewed, opened, etc. After disguise processing 630 (e.g., using DAN as described above), the feature vector 615 is revised to have a plain tie pattern 621 and a black suit color 631. In this example, the revise NN 430 (FIG. 4) of DAN learns the type of knowledge (i.e., trained) by other user's population data; and makes the decision for the revision of the feature vector 615. The revised feature vector 615 provides a better opportunity to receive a positive result (i.e., clicked on or view) than the original feature vector 615). It should be noted that other features could also be revised/disguised to improve the sought after positive results, such as time of day, day of week, etc. that the TV advertisement 610 was placed in order to optimize the likelihood of having a positive result. It should also be noted that in some embodiments, if a certain feature is not changed, the revise NN 430 of DAN outputs zero on that feature meaning nothing needs to be changed on that certain feature.

FIG. 6B shows an example of disguising a feature vector 616 for an electronic coupon 611, according to some embodiments. In the example electronic coupon 611, the original feature vector 616 includes a feature for a $5 discount coupon 640. Assume the received electronic coupon 611 was not clicked on, viewed, opened, etc. After disguise processing 630 (e.g., using DAN as described above), the feature vector 616 is revised to have an electronic coupon with a feature of a $7.80 discount coupon 641. The revised feature vector 616 provides a better opportunity to receive a positive result (i.e., clicked on, viewed, opened, etc.) than the original feature vector 616). It should be noted that other features could also be revised/disguised to improve the sought after positive results, such as time of day, day of week, etc. that the electronic coupon 611 was placed in order to optimize the likelihood of having a positive result.

Figure 7:
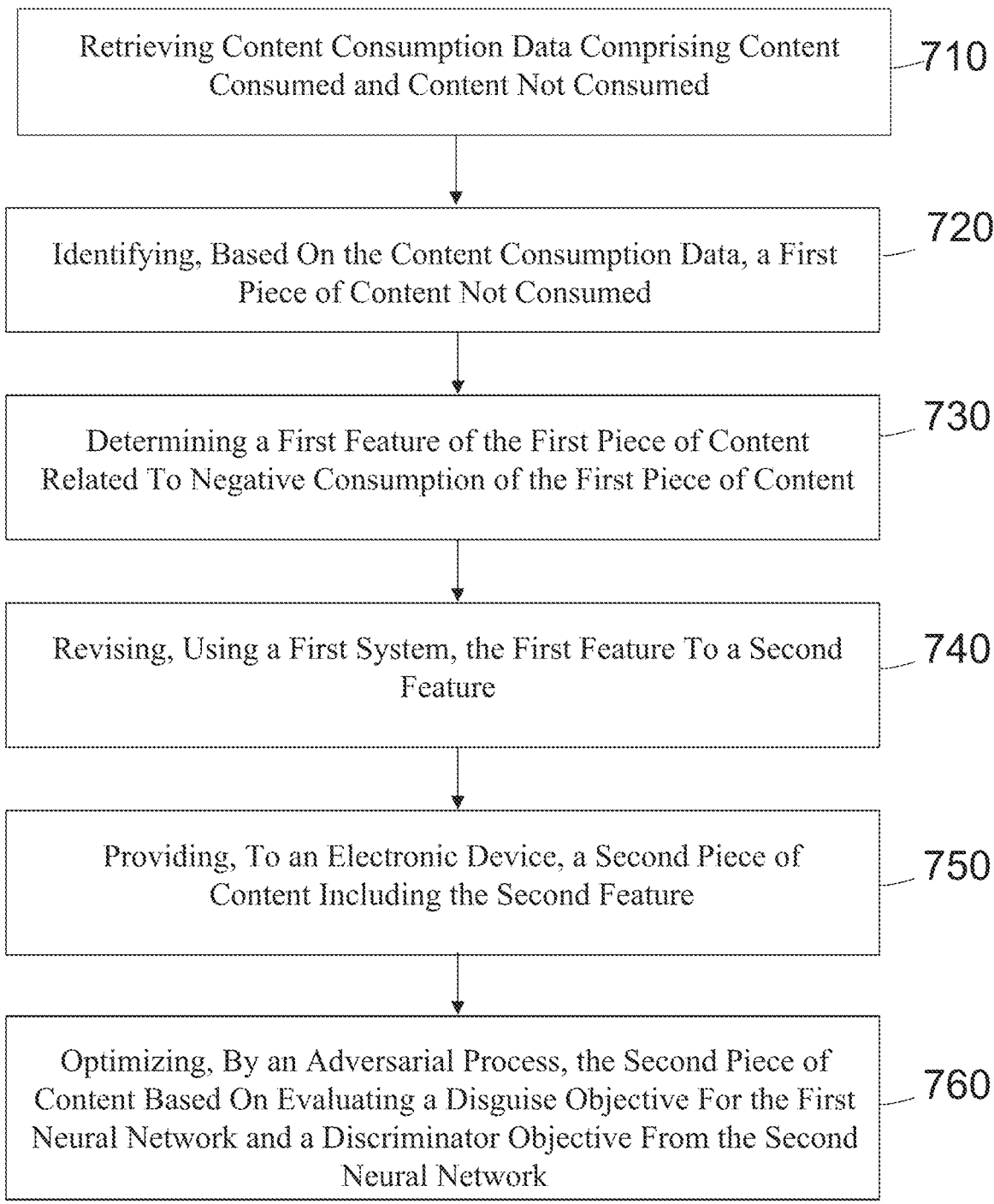
FIG. 7 shows a block diagram of a process for revising content based on adversarial machine learning, according to some embodiments.

FIG. 7 shows a block diagram of a process 700 for revising content based on adversarial machine learning using NN revision and NN discriminator processing, according to some embodiments. In some embodiments, block 710 of process 700 provides retrieving content consumption data (e.g., obtaining clicked and non-clicked content data from a device 120, FIG. 2, etc.) including content consumed (e.g., a positive action toward content) and content not consumed (e.g., a negative action toward content). In some embodiments, the retrieval of content consumption data may be made from different promotional/advertising campaigns by determining positive and negative user actions, etc. In block 720, process 700 identifies, based on the content consumption data, a first piece of content not consumed (e.g., no action on the content, non-clicked content, etc.). In block 730, process 700 determines a first feature (e.g., a first feature or feature value of a feature vector) of the first piece of content related to negative consumption of the first piece of content. In some embodiments, the determination is based on the type of content or item involved. For example, a tie may have features such as: width, color, pattern, material, shape, etc. DAN determines, based on training/learning of historical data (e.g., prior positive actions of similar content, products, etc.), what feature(s), if revised, may result in a positive action when compared to other revisions. In block 740, process 700 revises, using a first system (e.g., a first machine learning process, a first NN system, the revise NN 430, FIG. 4), the first feature to a second feature (e.g., a revised/disguised feature; disguised non-clicks, 421, FIG. 4, etc.). In block 750, process 700 provides, to an electronic device (e.g., electronic device 120, FIG. 2), a second piece of content (e.g., a revised TV advertisement, a revised electronic coupon, etc.) including the second feature (the second piece of content is a revised instance of the first piece of content). In block 760, process 700 optimizes, by an adversarial process (e.g., adversarial gambling 460, FIG. 4), the second piece of content based on evaluating a disguise objective (e.g., disguise objective 450, FIG. 4) for the first neural network (e.g., revise NN 430, FIG. 4) and a discriminator objective (e.g., discriminator objective 470, FIG. 4) from the second neural network (e.g., discriminator NN 440, FIG. 4).

In some embodiments, process 700 includes transforming, by the first system (e.g., the revise NN 430, FIG. 4), the first piece of content to multiple pieces of content. Each piece of the multiple pieces of content changes a distinctive feature (e.g., a feature of a feature vector) of the first piece of content; evaluating, using a second system (e.g., the discriminator NN 440, FIG. 4), each piece of the multiple pieces of content using a trained model (e.g., via machine learning). In some embodiments, the trained model is trained based on the content consumption data. The process 700 further includes identifying the second piece of content based on an evaluation result determining the second piece of content has a likelihood of consumption success (e.g., a positive action, a click on content, etc.).

In some embodiments, process 700 further includes: identifying, based on the content consumption data, a third piece of content consumed; determining a second feature that causes consumption of the third piece of content; and finding the second piece of content. The second piece of content replaces the first feature with the second feature.

In some embodiments, process 700 further includes updating the first system (e.g., the revise NN 430, FIG. 4) based on the trained model. Process 700 may further include: assigning, by the second system, the second piece of content to a positive consumption class or a negative consumption class; and upon a determination that the second piece of content is assigned to the positive consumption class, providing the second piece of content to the electronic device. In some embodiments, the second neural network (e.g., the discriminator NN 440, FIG. 4) mimics user behavior on content consumption rating.

Figure 8:
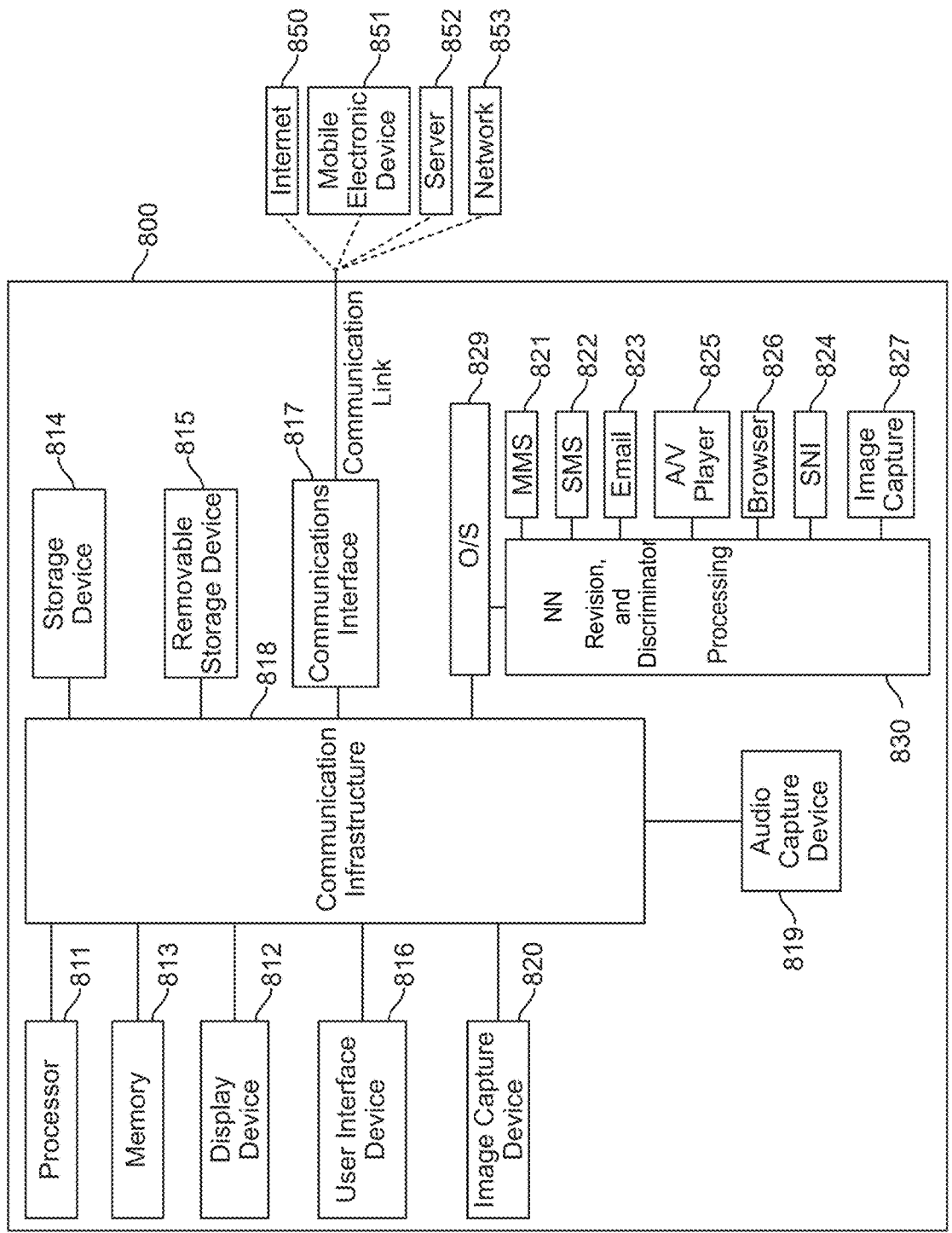
FIG. 8 is a high-level block diagram showing an information processing system comprising a computing system implementing one or more embodiments.

FIG. 8 is an exemplary high-level block diagram showing an information processing system comprising a computing system implementing one or more embodiments. The system 800 includes one or more processors 811 (e.g., ASIC, CPU, etc.), and may further include an electronic display device 812 (for displaying graphics, text, and other data), a main memory 813 (e.g., random access memory (RAM), cache devices, etc.), storage device 814 (e.g., hard disk drive), removable storage device 815 (e.g., removable storage drive, removable memory, a magnetic tape drive, optical disk drive, computer-readable medium having stored therein computer software and/or data), user interface device 816 (e.g., keyboard, touch screen, keypad, pointing device), and a communication interface 817 (e.g., modem, wireless transceiver (such as Wi-Fi, Cellular), a network interface (such as an Ethernet card), a communications port, or a PCMCIA slot and card).

The communication interface 817 allows software and data to be transferred between the computer system and external devices through the Internet 850, mobile electronic device 851, a server 852, a network 853, etc. The system 800 further includes a communications infrastructure 818 (e.g., a communications bus, cross bar, or network) to which the aforementioned devices 811 through 817 are connected.

The information transferred via communications interface 817 may be in the form of signals such as electronic, electromagnetic, optical, or other signals capable of being received by communications interface 817, via a communication link that carries signals and may be implemented using wire or cable, fiber optics, a phone line, a cellular phone link, a radio frequency (RF) link, and/or other communication channels.

In one implementation of one or more embodiments in an electronic device (e.g., electronic device 120, FIG. 2), the system 800 further includes an image capture device 820, such as a camera 128 (FIG. 2), and an audio capture device 819, such as a microphone 122 (FIG. 2). The system 800 may further include application processing or processors as MMS 821, SMS 822, email 823, social network interface (SNI) 824, audio/video (AV) player 825, web browser 826, image capture 827, etc.

In one embodiment, the system 800 includes NN revision and discriminator processing 830 that may implement processing similar as described regarding NN revision and discriminator processing 130 and/or 131 (FIG. 2), DAN processing (FIG. 4), and process 700 (FIG. 7) as described above. In one embodiment, the NN revision and discriminator processing 830 along with an operating system 829 may be implemented as executable code residing in a memory of the system 800. In another embodiment, the NN revision and discriminator processing 830 may be provided in hardware, firmware, etc.

In one embodiment, the main memory 813, storage device 814 and removable storage device 815, each by themselves or in any combination, may store instructions for the embodiments described above that may be executed by the one or more processors 811.

As is known to those skilled in the art, the aforementioned example architectures described above, according to said architectures, can be implemented in many ways, such as program instructions for execution by a processor, as software modules, microcode, as computer program product on computer readable media, as analog/logic circuits, as application specific integrated circuits, as firmware, as consumer electronic devices, AV devices, wireless/wired transmitters, wireless/wired receivers, networks, multi-media devices, etc. Further, embodiments of said Architecture can take the form of an entirely hardware embodiment, an entirely software embodiment or an embodiment containing both hardware and software elements.

One or more embodiments have been described with reference to flowchart illustrations and/or block diagrams of methods, apparatus (systems) and computer program products according to one or more embodiments. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic, implementing one or more embodiments. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Computer program instructions representing the block diagram and/or flowcharts herein may be loaded onto a computer, programmable data processing apparatus, or processing devices to cause a series of operations performed thereon to produce a computer implemented process. Computer programs (i.e., computer control logic) are stored in main memory and/or secondary memory. Computer programs may also be received via a communications interface. Such computer programs, when executed, enable the computer system to perform the features of the embodiments as discussed herein. In particular, the computer programs, when executed, enable the processor and/or multi-core processor to perform the features of the computer system. Such computer programs represent controllers of the computer system. A computer program product comprises a tangible storage medium readable by a computer system and storing instructions for execution by the computer system for performing a method of one or more embodiments.

Though the embodiments have been described with reference to certain versions thereof; however, other versions are possible. Therefore, the spirit and scope of the appended claims should not be limited to the description of the preferred versions contained herein.

What is claimed is:

1. A recommendation method, comprising:
retrieving content consumption data comprising content consumed and content not consumed;
identifying, based on the content consumption data, a first piece of content not consumed;
determining a first feature of the first piece of content, wherein the first feature has a first feature value related to negative consumption of the first piece of content;
disguising the first piece of content as a second piece of content by changing, using a first system, the first feature of the first piece content from the first feature value to a second feature value different from the first feature value;
determining whether the disguising is successful by classifying, using a second system that is different from the first system, the second piece of content, wherein the disguising is successful in response to the second piece of content classified with a class representing positive consumption; and
providing, to an electronic device, the second piece of content in response to determining the disguising is successful;
wherein the first system is trained to disguise pieces of content that are not consumed such that the second system classifies the resulting disguised pieces of content with the class representing positive consumption, and the second system is trained to mimic user behavior on content consumption rating.

2. The recommendation method of claim 1, further comprising:
transforming, using the first system, the first piece of content to a plurality of pieces of content, wherein each piece of the plurality of pieces of content changes a distinctive feature of the first piece of content;
evaluating, using the second system, each piece of the plurality of pieces of content using a trained model, wherein the trained model has been trained based on the content consumption data; and
identifying the second piece of content based on an evaluation result determining the second piece of content has a likelihood of consumption success.

3. The recommendation method of claim 2, further comprising:
updating the first system based on the trained model.

4. The recommendation method of claim 2, further comprising:
classifying, by the second system, the second piece of content with a positive consumption class representing positive consumption or a negative consumption class representing negative consumption; and upon a determination that the second piece of content is classified with the positive consumption class, providing the second piece of content to the electronic device.

5. The recommendation method of claim 2, wherein the first system comprises a first neural network, and the second system comprises a second neural network.

6. The recommendation method of claim 5, further comprising:
optimizing, by an adversarial process, a likelihood of consumption of the second piece of content based on evaluating a disguise objective for the first neural network and a discriminator objective from for the second neural network.

7. The recommendation method of claim 1, further comprising:
identifying, based on the content consumption data, a third piece of content consumed;
determining a second feature that causes consumption of the third piece of content; and
finding the second piece of content, wherein the second piece of content replaces the first feature with the second feature.

8. An electronic device comprising:
a memory storing instructions; and
at least one processor executing the instructions including a process configured to:
retrieve content consumption data comprising content consumed and content not consumed;
identify, based on the content consumption data, a first piece of content not consumed;
determine a first feature of the first piece of content, wherein the first feature has a first feature value related to negative consumption of the first piece of content;
disguise the first piece of content as a second piece of content by changing, using a first system, the first feature of the first piece content from the first feature value to a second feature value different from the first feature value;
determine whether the disguise is successful by classifying, using a second system that is different from the first system, the second piece of content, wherein the disguise is successful in response to the second piece of content classified with a class representing positive consumption; and
provide the second piece of content in response to determining the disguise is successful;
wherein the first system is trained to disguise pieces of content that are not consumed such that the second system classifies the resulting disguised pieces of content with the class representing positive consumption, and the second system is trained to mimic user behavior on content consumption rating.

9. The electronic device of claim 8, wherein the process is further configured to:
transform, using the first system, the first piece of content to a plurality of pieces of content, wherein each piece of the plurality of pieces of content changes a distinctive feature of the first piece of content;
evaluate, using the second system, each piece of the plurality of pieces of content using a trained model, wherein the trained model has been trained based on the content consumption data; and
identify the second piece of content based on an evaluation result determining the second piece of content has a likelihood of consumption success.

10. The electronic device of claim 9, wherein the process is further configured to:
update the first system based on the trained model;
classify, by the second system, the second piece of content with a positive consumption class representing positive consumption or a negative consumption class representing negative consumption; and
upon a determination that the second piece of content is classified with the positive consumption class, provide the second piece of content to the electronic device.

11. The electronic device of claim 9, wherein the first system comprises a first neural network, and the second system comprises a second neural network.

12. The electronic device of claim 11, wherein the process is further configured to:
optimize, by an adversarial process, a likelihood of consumption of the second piece of content based on evaluating a disguise objective for the first neural network and a discriminator objective for the second neural network.

13. The electronic device of claim 8, wherein the process is further configured to:
identify, based on the content consumption data, a third piece of content consumed;
determine a second feature that causes consumption of the third piece of content; and
find the second piece of content, wherein the second piece of content replaces the first feature with the second feature.

14. A non-transitory processor-readable medium that includes a program that when executed by a processor performing a method comprising:
retrieving content consumption data comprising content consumed and content not consumed;
identifying, based on the content consumption data, a first piece of content not consumed;
determining a first feature of the first piece of content, wherein the first feature has a first feature value related to negative consumption of the first piece of content;
disguising the first piece of content as a second piece of content by changing, using a first system, the first feature of the first piece content from the first feature value to a second feature value different from the first feature value;
determining whether the disguising is successful by classifying, using a second system that is different from the first system, the second piece of content, wherein the disguising is successful in response to the second piece of content classified with a class representing positive consumption; and
providing, to an electronic device, the second piece of content in response to determining the disguising is successful;
wherein the first system is trained to disguise pieces of content that are not consumed such that the second system classifies the resulting disguised pieces of content with the class representing positive consumption, and the second system is trained to mimic user behavior on content consumption rating.

15. The non-transitory processor-readable medium of claim 14, wherein the method further comprises:
transforming, using the first system, the first piece of content to a plurality of pieces of content, wherein each piece of the plurality of pieces of content changes a distinctive feature of the first piece of content;
evaluating, using the second system, each piece of the plurality of pieces of content using a trained model, wherein the trained model has been trained based on the content consumption data; and identifying the second piece of content based on an evaluation result determining the second piece of content has a likelihood of consumption success.

16. The non-transitory processor-readable medium of claim 15, wherein the method further comprises:

updating the first system based on the trained model;

classifying, by the second system, the second piece of content with a positive consumption class representing positive consumption or a negative consumption class representing negative consumption; and upon a determination that the second piece of content is classified with the positive consumption class, providing the second piece of content to the electronic device.

17. The non-transitory processor-readable medium of claim 15, wherein the first system comprises a first neural network, and the second system comprises a second neural network.

18. The non-transitory processor-readable medium of claim 17, wherein the method is further configured to:

optimize, by an adversarial process, a likelihood of consumption of the second piece of content based on evaluating a disguise objective for the first neural network and a discriminator objective for the second neural network.

19. The non-transitory processor-readable medium of claim 14, wherein the method further comprises:

identifying, based on the content consumption data, a third piece of content consumed;

determining a second feature that causes consumption of the third piece of content; and finding the second piece of content, wherein the second piece of content replaces the first feature with the second feature.

* * * * *